(12) United States Patent
Maehata et al.

(10) Patent No.: US 6,415,929 B1
(45) Date of Patent: Jul. 9, 2002

(54) METHOD OF SEPARATING PLASTIC (75) Inventors: Hidehiko Maehata; Tetsuya Inoue; Masanori Tsukahara; Daisuke Tamakoshi, all of Osaka (JP)

(73) Assignee: Hitachi Zosen Corporation (JP)

( * ) Notice: Subject to any disclaimer, the term of this patent is extended or adjusted under 35 U.S.C. 154(b) by 0 days.

(21) Appl. No.: 09/807,789

(22) PCT Filed: Nov. 15, 1999

(86) PCT No.: PCT/JP99/06373

§ 371 (c)(1), (2), (4) Date: Apr. 18, 2001

(87) PCT Pub. No.: WO00/29119

PCT Pub. Date: May 25, 2000

(30) Foreign Application Priority Data

| Nov. 18, 1998 | (JP) | .......................... | 10-327372 |
| Jun. 11, 1999 | (JP) | .......................... | 11-164534 |

(51) Int. Cl.[7] ............................................... B03C 7/00
(52) U.S. Cl. .................. 209/12.2; 209/127.3; 209/129; 209/130
(58) Field of Search ............................ 209/127.1, 127.3, 209/127.4, 128, 129, 130, 12.2

(56) References Cited

U.S. PATENT DOCUMENTS 5,746,320 A * 5/1998 Fujita et al. ............ 209/127.3

FOREIGN PATENT DOCUMENTS

| JP | 07178351 A | * | 7/1995 | |
| JP | 09094482 A | * | 4/1997 | |
| JP | 09299829 A | * | 11/1997 | |
| JP | 09299830 A | * | 11/1997 | |
| SU | 1375346 | * | 2/1988 | ............ 209/127.3 |

* cited by examiner

*Primary Examiner*—Tuan N. Nguyen
(74) *Attorney, Agent, or Firm*—Mark Kusner; Michael A. Jaffe (57) ABSTRACT

When plastic pieces of plural different types of resins fed into a hopper are agitated to be triboelectrically charged, the plastic pieces are not imparted with sufficient amounts of charges or proper polarities which are required for separation of the plastic pieces if there are great differences in quantity between the different types of plastic pieces. This makes it impossible to properly separate the plastic pieces. Where the amount of pieces of a particular plastic to be separated is small, pieces of the particular plastic are additionally fed as a triboelectrification agent into a triboelectric charger (3) and agitated with the plastic pieces. Thus, different types of plastic pieces (1) (e.g., PVC and PE) are prevented from being imparted with the same polarity and are imparted with different amounts of charges, so that the separation can assuredly be carried out in an electrostatic separating section (G) for recovery of the particular plastic pieces.

5 Claims, 6 Drawing Sheets

METHOD OF SEPARATING PLASTIC

TECHNICAL FIELD

The present invention relates to a plastic separation method for separating crushed waste including plural types of plastic pieces in a mixed state according to the type of plastic.

BACKGROUND ART

In recent years, recycling of waste has rapidly been promoted. Plastics consumed as materials for plastic products include vinyl chloride resins (hereinafter referred to as "PVC"), polyethylene resins (hereinafter referred to as "PE"), polypropylene resins (hereinafter referred to as "PP"), polystyrene resins (hereinafter referred to as "PS") and methacryl resins [acryl resins] (hereinafter referred to as "PMMA"), which account for about 80% of the total. Plastic wastes to be collected are mostly of these resins. Further, polyethylene terephthalate resins (hereinafter referred to as "PET") which are mainly used as a material for PET bottles are collected in a unique manner. For recycling of these resins, it is important to separate the resins according to the type thereof.

One of prior art techniques for separating crushed plastic pieces is a plastic separator utilizing the electrostatic properties of the plastic pieces. An explanation will be given to the plastic separator S with reference to FIG. 6.

Figure 6:
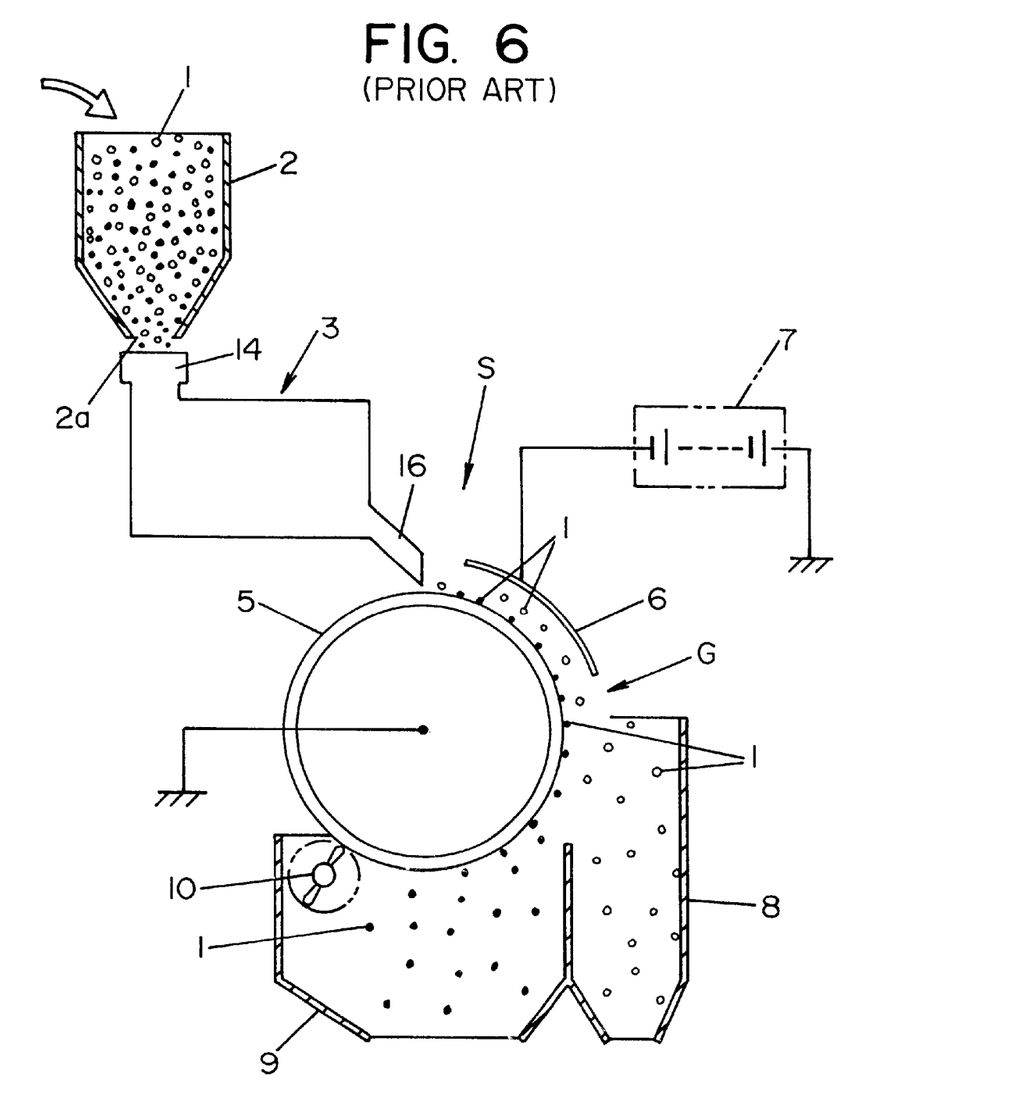
FIG. 6 is a schematic diagram illustrating an overall construction of a prior art plastic separator.

In the plastic separator S, crushed plastic waste including plastic pieces 1 of different types of resins to be separated are mixedly fed into a hopper 2. Plural types of plastic pieces 1 in a mixed state are fed into a triboelectric charger 3 from an outlet of the hopper 2, and agitated to be triboelectrically charged in the triboelectric charger 3. Then, the plastic pieces are spread onto an upper surface of a metal drum electrode 5. The metal drum electrode 5 is rotatable about a horizontal axis in a predetermined direction, and grounded.

A high voltage electrode 6 of an arcuate plate is disposed diagonally above the metal drum electrode 5 as extending in the direction of the rotation of the metal drum electrode. An electrode, e.g., a cathode, of a high voltage power source 7 is connected to the high voltage electrode 6, and an anode of the high voltage power source 7 is grounded. With this arrangement, the metal drum electrode 5 constitutes a rotary ground electrode, so that a separation electrostatic field is generated between the high voltage electrode 6 and the metal drum electrode 5.

A first separation vessel 8 and a second separation vessel 9 each having an open top are disposed below the metal drum electrode 5 in this order on the upstream side with respect to the rotation direction. A brush 10 is provided adjacent an outer circumferential surface of the metal drum electrode 5 for scraping plastic pieces 1 attached on the circumferential surface of the metal drum electrode 5.

An explanation will be given to a method for the separation of the plastic pieces 1 which employs the aforesaid construction. The mixed plastic pieces 1, i.e. the plural types of plastic pieces 1 are fed into the triboelectric charger 3 from the hopper 2. Then, the different types of plastic pieces 1 are agitated in a cylindrical body of the triboelectric charger 3 thereby to be brought into friction. Thus, the plastic pieces 1 are triboelectrically imparted with different amounts of charges having different polarities on a piece-by-piece basis. Then, the triboelectrically charged plastic pieces 1 are spread onto the metal drum electrode 5. Plastic pieces 1 negatively charged in the triboelectric charger 3 are repelled by the high voltage electrode 6 and attracted onto the metal drum electrode 5, and then allowed to fall into the second separation vessel 9 by the rotation of the metal drum electrode or scraped down from the surface of the metal drum electrode 5 into the second separation vessel 9 by the brush 10. On the other hand, plastic pieces 1 positively charged are attracted toward the high voltage electrode 6 and allowed to fall into the first separation vessel 8 by the rotation of the metal drum electrode 5.

As described above, the prior art triboelectric charger 3 is adapted to agitate the plastic pieces 1 of the plural different types of resins fed into the hopper 2 to triboelectrically charge the plastic pieces. If differences in amount (or total surface area) between the different types of plastic pieces 1 are too great, however, the plastic pieces 1 are not necessarily charged according to so-called triboelectric series during agitation, so that a required amount of charges (electrostatic potential) having a required polarity cannot be imparted to each of the plastic pieces for the separation. In such a case, it is impossible to properly carry out the separation by means of the metal drum electrode 5 and the high voltage electrode 6 by utilizing the charges imparted to the plastic pieces 1. It is therefore an object of the present invention to provide a plastic separation method which can solve the aforesaid problem.

DISCLOSURE OF THE INVENTION

Where the amount of a particular plastic to be separated is very small, the triboelectric charging is not necessarily carried out according to the triboelectric series on the basis of the type of plastic, so that the amount of charges imparted to the plastic is not sufficient for electrostatic separation. The invention solves this problem by increasing the amount of the particular plastic to such a level that the electrostatic separation can properly be performed. However, the particular plastic is present in a given amount, which cannot be changed as desired. Therefore, a plastic separation method is provided, in which a plastic of the same type as the particular plastic is added as a triboelectrification agent and, after the plastic is triboelectrically charged, the agent is not transferred to a separation process but left in a triboelectric charger for repeated use thereof.

More specifically, the present invention provides a method of separating pieces of a particular plastic from a mixture of plural types of crushed plastic pieces, the method comprising the steps of: feeding the crushed plastic pieces into a triboelectric charger; agitating the plastic pieces in the triboelectric charger for triboelectrically imparting the plastic pieces with different amounts of charges having different polarities depending on the type of plastic; and electrostatically separating the plastic pieces in an electrostatic separating section; wherein pieces of the particular plastic in a predetermined granular shape or plastic pieces of the same type as the particular plastic are additionally fed as a triboelectrification agent into the triboelectric charger for triboelectrically imparting the particular plastic pieces with a polarity and an amount of charge which allow for separation of the particular plastic pieces in the electrostatic separating section, if the weight of the particular plastic pieces is insufficient as compared with the other plastic pieces, i.e., smaller than 10% of the total weight of the plastic pieces.

The weight of the triboelectrification agent to be added is determined so as to satisfy the following expression:

$$(Wt+Wm)/W = 0.1 \text{ to } 0.9$$

wherein Wt is the weight of the particular plastic pieces in the triboelectric charger, and W is the total weight of the plastic pieces including the triboelectrification agent fed into the triboelectric charger.

The triboelectrification agent has a size which is one half to twice the size of the plastic pieces.

In accordance with the present invention, the addition of the triboelectrification agent makes it possible to assuredly separate the particular plastic pieces even present in a relatively small amount in the electrostatic separating section for recovery of the particular plastic pieces.

Further, the diameter of the triboelectrification agent is determined so as to be greater than the size D of the plastic pieces. Hence, the plastic pieces and the triboelectrification agent can be separated according to the size, so that the triboelectrification agent can be left in the triboelectric charger after the triboelectric charging for repeated use thereof in the triboelectric charger.

Alternatively, the diameter of the triboelectrification agent is determined so as to be different from the size of the plastic pieces. After the triboelectric charging, the plastic pieces and the triboelectrification agent are all expelled from the triboelectric charger, and separated according to the size. Then, the triboelectrification agent is fed back into the triboelectric charger so as to be repeatedly used.

Thus, the repeated use of the triboelectrification agent can be achieved for better economy.

EMBODIMENTS OF THE INVENTION

Figure 1:
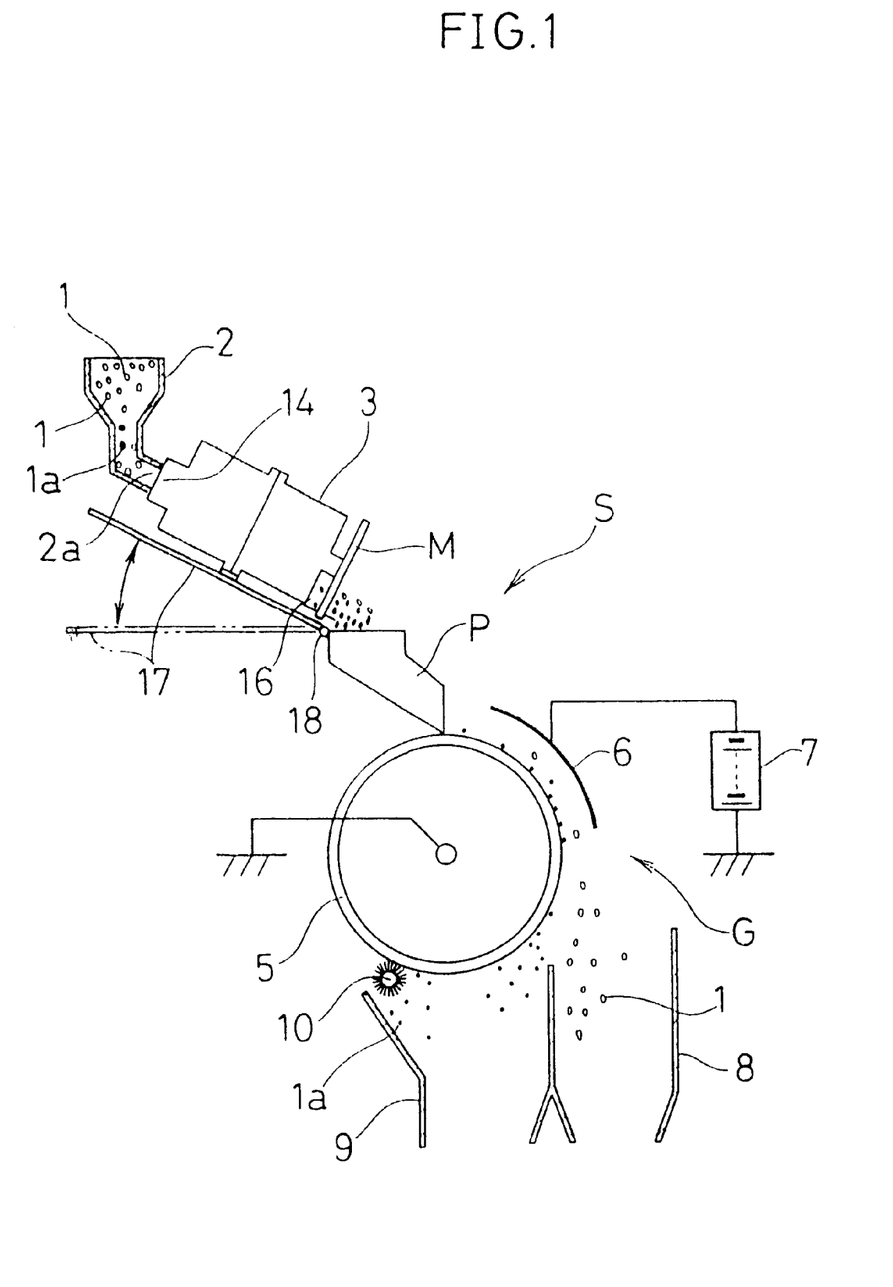
FIG. 1 is a schematic diagram illustrating an overall construction of a plastic separator according to a first embodiment of the present invention.

Embodiments of the present invention will hereinafter be described with reference to the drawings. With reference to FIG. 1, an explanation will first be given to a plastic separator S to be employed for implementing a plastic separation method according to a first embodiment of the present invention.

The plastic separator S comprises: a hopper 2 for receiving a mixture of plastic pieces 1 of plural different types of resins (crushed waste to be separated); a triboelectric charger 3 disposed adjacent an outlet 2a of the hopper 2 for agitating the plastic pieces 1 to triboelectrically impart the plastic pieces with different amounts of charges having different polarities depending on the type of plastic; an electrostatic separating section G disposed below the triboelectric charger 3 for electrostatically separating the triboelectrically charged plastic pieces 1; and a first separation vessel 8 and a second separation vessel 9 for (selectively) collecting the plastic pieces 1 electrostatically separated in the electrostatic separating section G according to the type of plastic.

The triboelectric charger 3 is placed on a tilt base 17, which is provided rotatably about a hinge member 18 provided adjacent a chute P to be described later. The tilt base 17 is kept horizontal during the triboelectric charging. After completion of the triboelectric charging, the tilt base 17 is tilted about the hinge member 18, so that the triboelectric charger 3 is tilted at a desired angle for expelling the plastic pieces 1 from the inside thereof.

The triboelectric charger 3 has an agitator (not shown) provided inside a container thereof for agitating the plastic pieces, an inlet 14 provided in a top face of the container on one side thereof in communication with the outlet 2a of the hopper 2, and an outlet 16 provided in a bottom face of the container on the other side thereof for dropping the plastic pieces 1.

A mesh member M having a mesh smaller than the diameter of a triboelectrification agent to be described layer is provided in the outlet 16. The chute P is provided between the mesh member M and the electrostatic separating section G for feeding the plastic pieces 1 into the electrostatic separating section G.

As shown in FIG. 1, the electrostatic separating section G comprises: a metal drum electrode 5 disposed below the chute P; a high voltage electrode 6 disposed in a diagonally right upper position with respect to the metal drum electrode 5; and a brush 10 disposed below the metal drum electrode 5 for scraping down the plastic pieces 1 attached on a circumferential surface of the metal drum electrode 5.

The metal drum electrode 5 is rotatable about a horizontal axis in a predetermined direction, and grounded. The high voltage electrode 6 is connected to a cathode of a high voltage power source 7. An anode of the high voltage power source 7 is grounded. With this arrangement, the metal drum electrode 5 constitutes a rotary ground electrode, so that a separation electrostatic field is generated between the high voltage electrode 6 and the metal drum electrode 5.

The first separation vessel 8 and the second separation vessel 9 are disposed below the metal drum electrode 5 in this order in the direction of the rotation of the metal drum electrode 5. The first separation vessel 8 and the second separation vessel 9 each have an open top.

Next, an explanation will be given to a plastic separation method to be implemented by the plastic separator S having the aforesaid construction.

The plastic pieces 1 are produced by crushing so as to have a size D which is smaller than the mesh of the mesh body M. The plural types of plastic pieces in a mixed state are fed into the triboelectric charger 3 from the hopper 2. Thus, the plural types of plastic pieces 1 are agitated in the triboelectric charger 3 thereby to be triboelectrically imparted with different amounts of charges having different polarities depending on the type of plastic on the basis of triboelectric series (which will be described later) on a piece-by-piece basis.

Where the amount of pieces 1a of a particular plastic, e.g., PVC, to be recovered (or separated) is small when the plastic pieces 1 are triboelectrically charged in the triboelectric charger 3, pieces of the particular plastic having a diameter which is greater than (e.g., twice) the grain size of the other plastic pieces 1 and greater than the mesh of the mesh member M are added in a predetermined amount as a triboelectrification agent. Provided that the crushed plastic pieces each have three dimensions (length, width and thickness or height) D, the diameter D1 of the triboelectrification agent is set greater than at least one of the dimensions D.

The plastic pieces 1 fed into the triboelectric charger 3 are agitated by the agitator within the container of the triboelectric charger 3 thereby to be brought into friction. At this time, the plastic pieces 1 are charged to be imparted with different amounts of charges (electrostatic potentials) having different polarities depending on the type of plastic on a piece-by-piece basis by the addition of the predetermined amount of the triboelectrification agent.

After the plastic pieces 1 are triboelectrically imparted with different amounts of charges having different polarities depending on the type of plastic, the tilt base 17 is tilted about the hinge member 18 to tilt the triboelectric charger 3. Thus, the triboelectrically charged plastic pieces 1 are dropped from the outlet 16.

Since the diameter D of the triboelectrification agent is set so as to be greater than the mesh of the mesh member M and satisfy a relationship of D<D1 with respect to the size D of the plastic pieces 1, the plastic pieces 1 (including the particular plastic pieces 1a) pass through the mesh member M to reach the chute P. The triboelectrification agent is caught by the mesh member M thereby to remain in the triboelectric charger 3. The plastic pieces 1 having passed, through the mesh member M are spread on the metal drum electrode 5 through the chute P.

The plastic pieces guided into the electrostatic separating section G by the chute P have been triboelectrically imparted with different amounts of charges having different polarities on a piece-by-piece basis in the triboelectric charger 3. Plastic pieces 1 negatively charged, for example, are repelled by the high voltage electrode 6 and attracted onto the metal drum electrode 5 thereby to be allowed to fall into the second separation vessel 9 by the rotation of the metal drum electrode 5, or scraped from the surface of the metal drum electrode 5 by the brush 10 thereby to fall into the second separation vessel 9. More specifically, PVC pieces, which are negatively charged, fall into the second separation vessel 9. On the contrary, plastic pieces 1 positively charged are attracted toward a surface of the high voltage electrode 6 and allowed to fall by the rotation of the metal drum electrode 5 thereby to be collected in the first separation vessel 8.

Where the amount of the particular plastic pieces 1 to be collected is insufficient, pieces of the particular plastic are additionally fed as the triboelectrification agent to cover the insufficiency. Thus, the particular plastic pieces can be imparted with a sufficient amount of charges thereby to be recovered from the mixed plastic pieces 1.

A specific test was performed for determination of recovery rate and purity by employing PE, PP, PS, PET and PVC plastic pieces 1. In this test, the weight ratio of these plastic pieces 1 was PE:PP:PS:PET:PVC=4:2:2:1:1, and the total weight of the plastic pieces 1 to be agitated in each cycle was 100 to 500 g. The test results are shown in a graph of FIG. 2.

Figure 2:
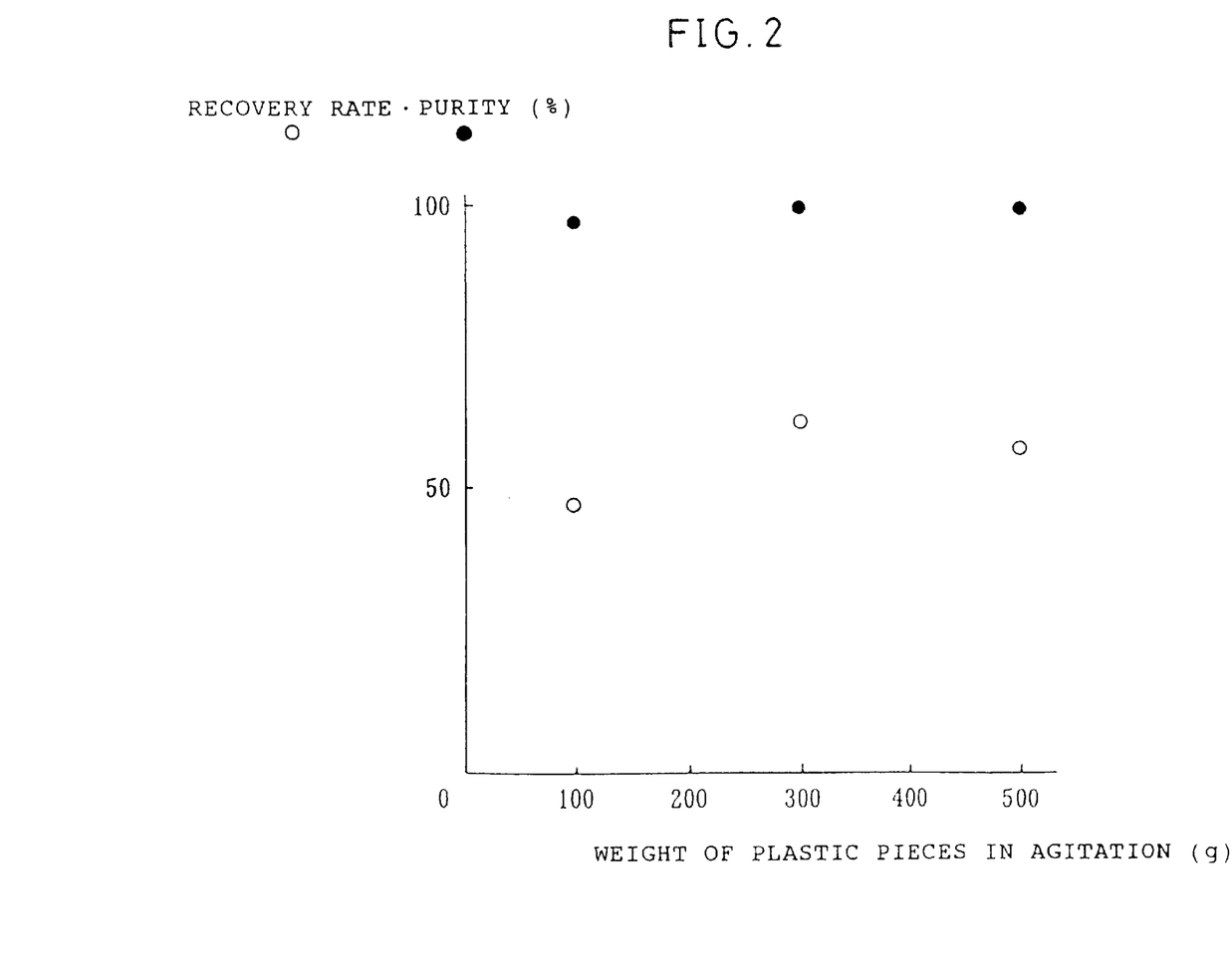
FIG. 2 is a graph showing a relationship between weight of plastic pieces in agitation, and recovery rate and purity of the plastic pieces.

In the graph, the recovery rate and purity are defined, where the PVC pieces are selectively collected in one of the separation vessels, as the recovery rate and purity of the PE, PP, PS and PET pieces 1 collected together in the other separation vessel. As is apparent from the graph, the purity (indicated by ●) is high (not lower than 90%), but the recovery rate (indicated by ○) is low (about 50%) in the case of the aforesaid weight ratio. In this test, the size of the plastic pieces was 3 mm, the diameter of the triboelectrification agent was 6 mm, and the mesh of the mesh member M was 5 mm.

Figure 3:
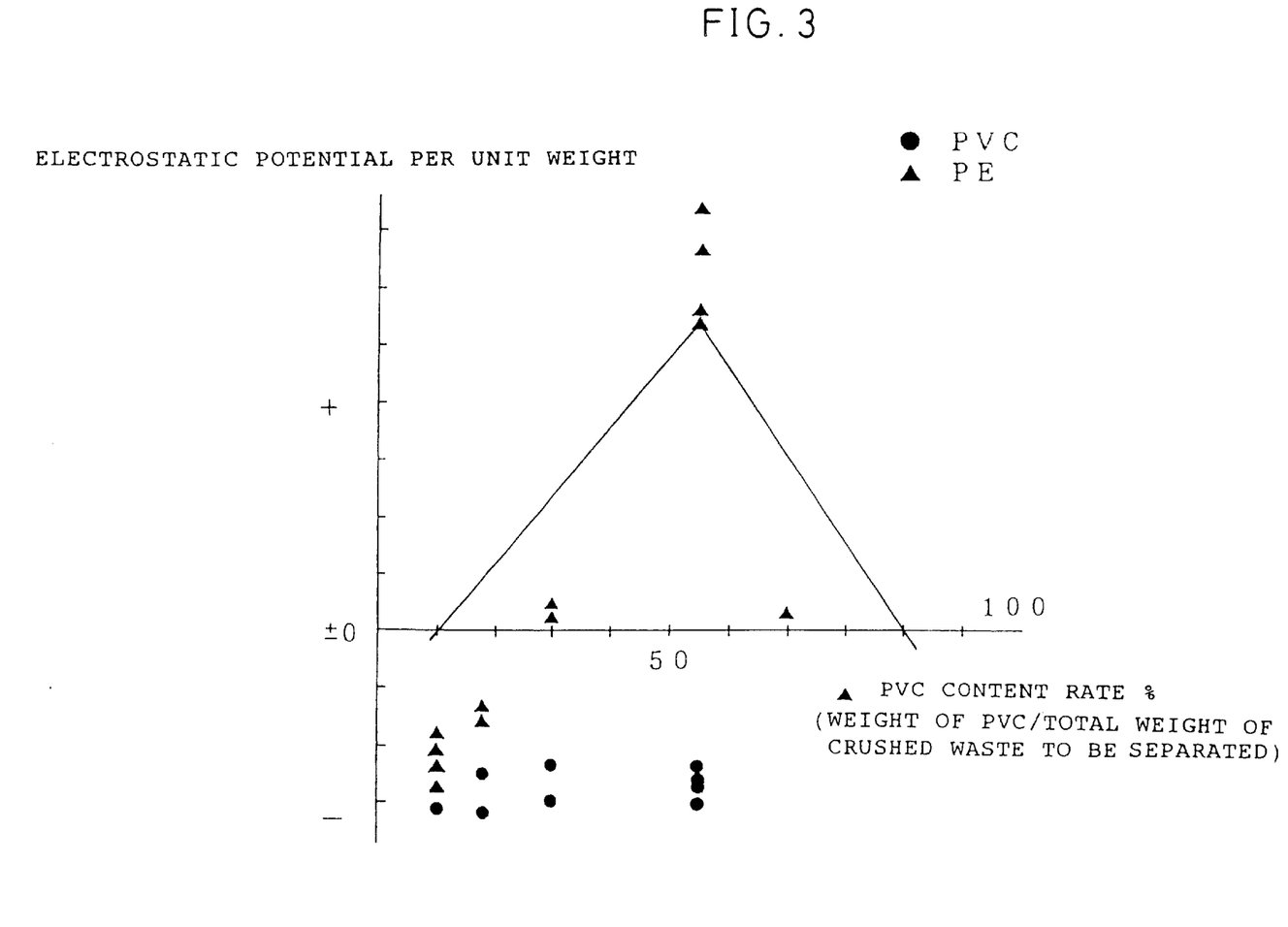
FIG. 3 is a graph showing a relationship between content weight of PVC and electrostatic potential per unit weight.

To find the cause of the low recovery rate described above, the electrostatic potentials of the PVC pieces and the PE pieces were determined after the plastic pieces 1 mixedly including the five types of plastic pieces were triboelectrically charged. The contents of the four types of plastic pieces other than the PVC pieces, i.e., the PE, PP, PS and PET pieces, were kept in the aforesaid ratio, and the content ratio of the PVC pieces was varied. The results are shown in FIG. 3. It was found that, where the PP pieces employed as a reference plastic material ranked middle in the triboelectric series were brought into friction with the other plastic pieces, the PE pieces which would have been positively charged on the basis of the triboelectric series were negatively charged like the PVC pieces when the content of the PVC pieces was not higher than 20 wt % or not lower than 80 wt %. If the PE pieces are negatively charged like the PVC pieces when the particular plastic pieces 1a, e.g., the PVC pieces, are to be separated from the other plastic pieces, the separating performance in the electrostatic separating section G is degraded.

Figure 4:
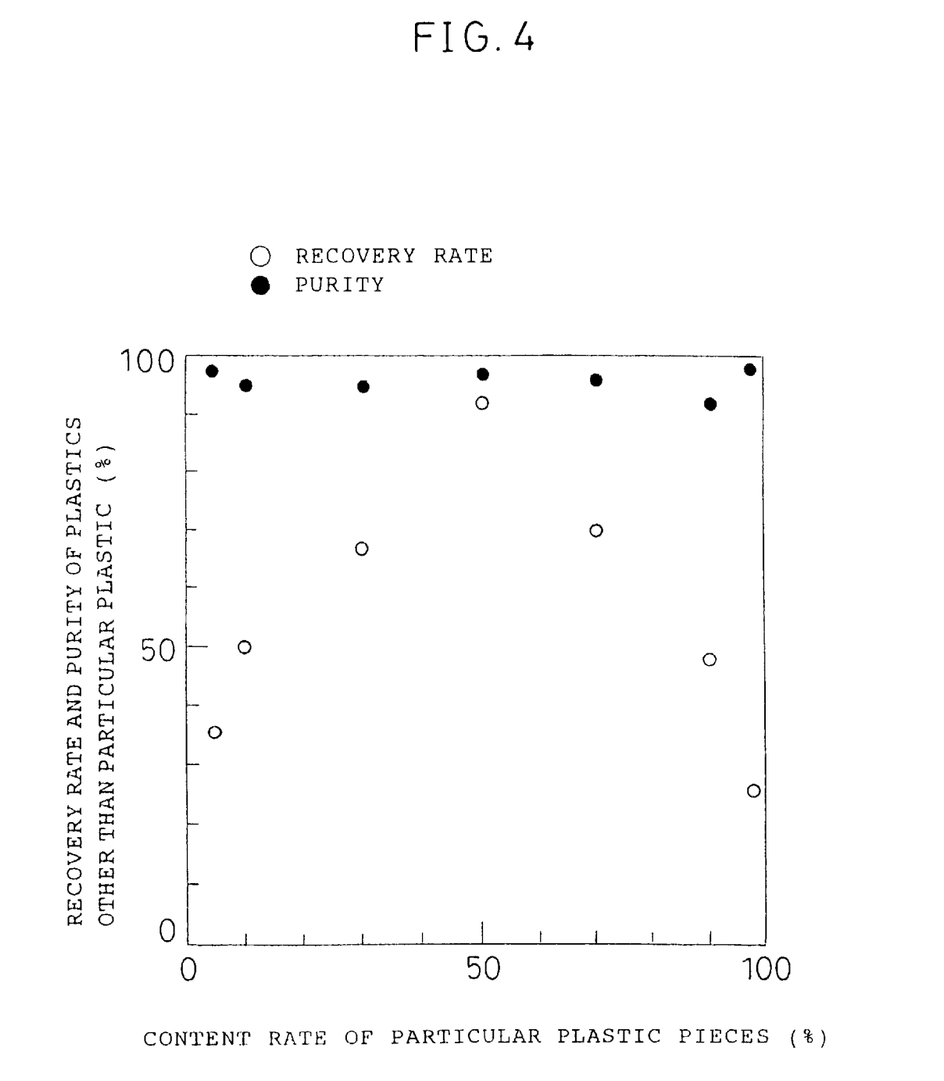
FIG. 4 is a graph showing a relationship between content rate of a particular type of plastic pieces, and recovery rate and purity of the other types of plastic pieces.

An experiment was carried out, in which the content ratio of the particular plastic pieces 1a was variably set by adding the triboelectrification agent to determine how the recovery rate and purity of the other plastic pieces were changed. In this experiment, the size of the plastic pieces 1a was 3 mm, the diameter of the triboelectrification agent was 6 mm, and the mesh of the mesh member M was 5 mm. The experiment was performed by variably setting a relationship of R=(Wt+Wm)/W, wherein Wt is the weight of the particular plastic pieces 1a, Wm is the weight of the triboelectrification agent to be added, and W is the total weight of the plastic pieces fed into the triboelectric charger 3 (including the weight of the triboelectrification agent). The results are shown in FIG. 4, in which the content R of the particular plastic pieces including the triboelectrification agent in the triboelectric charger, and the recovery rate and purity of the plastic pieces other than the particular plastic pieces in the separation vessel are plotted as abscissa and ordinate, respectively. As can be seen from the figure, the separation was achieved at a recovery rate of not lower than about 50% when the content of the particular plastic pieces including the triboelectrification agent was in the range between about 10% and about 90%, and at a recovery rate of greater than 90% when the content was about 50%. The purity after the separation exceeded 90% throughout the range of the content.

However, the results of the experiment were obtained under conditions such that the size of the plastic pieces 1 was 3 mm and the diameter of the triboelectrification agent was 6 mm and, if the triboelectrification agent has the same weight but has a different diameter, the surface area (size) of the triboelectrification agent in contact with the other plastic pieces 1 is changed. Therefore, it is not supposed that the aforesaid results are always true.

An experiment was carried out, in which the diameter D1 of the triboelectrification agent was 1.5 mm which is smaller than 6 mm. When the weight of the triboelectrification agent employed at this time was converted into the weight of 6-mm diameter triboelectrification agent having a total surface area equivalent to the 1.5-mm diameter triboelectrification agent, the results are substantially the same as shown in the graph of FIG. 4.

Next, an experiment was carried out, in which the diameter of-the triboelectrification agent was greater than twice the size of the particular plastic pieces 1a, e.g., 10 mm. The experiment revealed that a triboelectric charging period required for providing the results shown in FIG. 4 was increased more than two-fold.

In accordance with the first embodiment of the present invention, the plastic pieces can be recovered with a high purity when the R value is in the range between 0.1 and 0.9. However, the recovery rate of the particular plastic pieces is reduced as the R value is apart from 0.5. With R=0.1 or 0.9, for example, the recovery rate is low (about 50%), but this may be compensated by repeating the aforesaid separating operation several times. That is, the triboelectrification agent remaining in the triboelectric charger 3 is used again as it is. After the separating operation is once performed, a fraction mainly containing the particular plastic pieces 1a is agitated again with the triboelectrification agent to be triboelectrically charged, and the other plastic pieces 1 in the fraction are separated from the particular plastic pieces 1a. Thus, the recovery rate can be improved.

Where the PVC pieces (particular plastic pieces 1) were obtained at a recovery rate of 50% and the other plastic pieces 1 were mixedly present in a proportion of about 50% after the separating operation was performed once, for example, the remaining triboelectrification agent, which was used again as it was, was agitated with the particular plastic pieces 1 mixed with about 50% of the other plastic pieces 1 for triboelectric charging and, as a result, a recovery rate of 70% was provided. In this case, the purity was of course high (not lower than 90%). When the triboelectrification agent is re-used, the other plastic pieces 1 are fed into the triboelectric charger 3 in an amount corresponding to the amount of the remaining triboelectrification agent so that the particular plastic pieces 1a can be imparted with a predetermined polarity and a predetermined amount of charge. Thus, the high recovery rate can be achieved by repeating the electrostatic separating operation several times.

When PVC, PE, PP, PS and PET which are generally collected in a larger volume are to be arranged in the order from easily positively chargeable plastic to easily negatively chargeable plastic on the basis of the triboelectric series, the order is PS, PE, PP, PET, PVC according to "ELECTROSTATICS HANDBOOK" edited by Association of Electrostatics.

The PP ranked middle in the triboelectric series is herein employed as a reference plastic material. When the PP reference plastic material is brought into friction with the other plastic materials, the PS and the PE are positively charged, and the PS is imparted with a greater amount of charges. Further, the PP is barely charged. In addition, the PET and the PVC are negatively charged, and the PVC is imparted with a greater amount of charges. By thus employing the plastic material ranked middle in the triboelectric series as the reference plastic material, the plastic pieces 1 can be imparted with different amounts of charges having different polarities depending on the type of plastic.

Therefore, it is supposed in view of the triboelectric series that the PET is negatively charged like the PVC thereby to fall into the second separation vessel 9. This may be avoided by changing the voltage to be applied for the generation of the selection electrostatic field.

Figure 5:
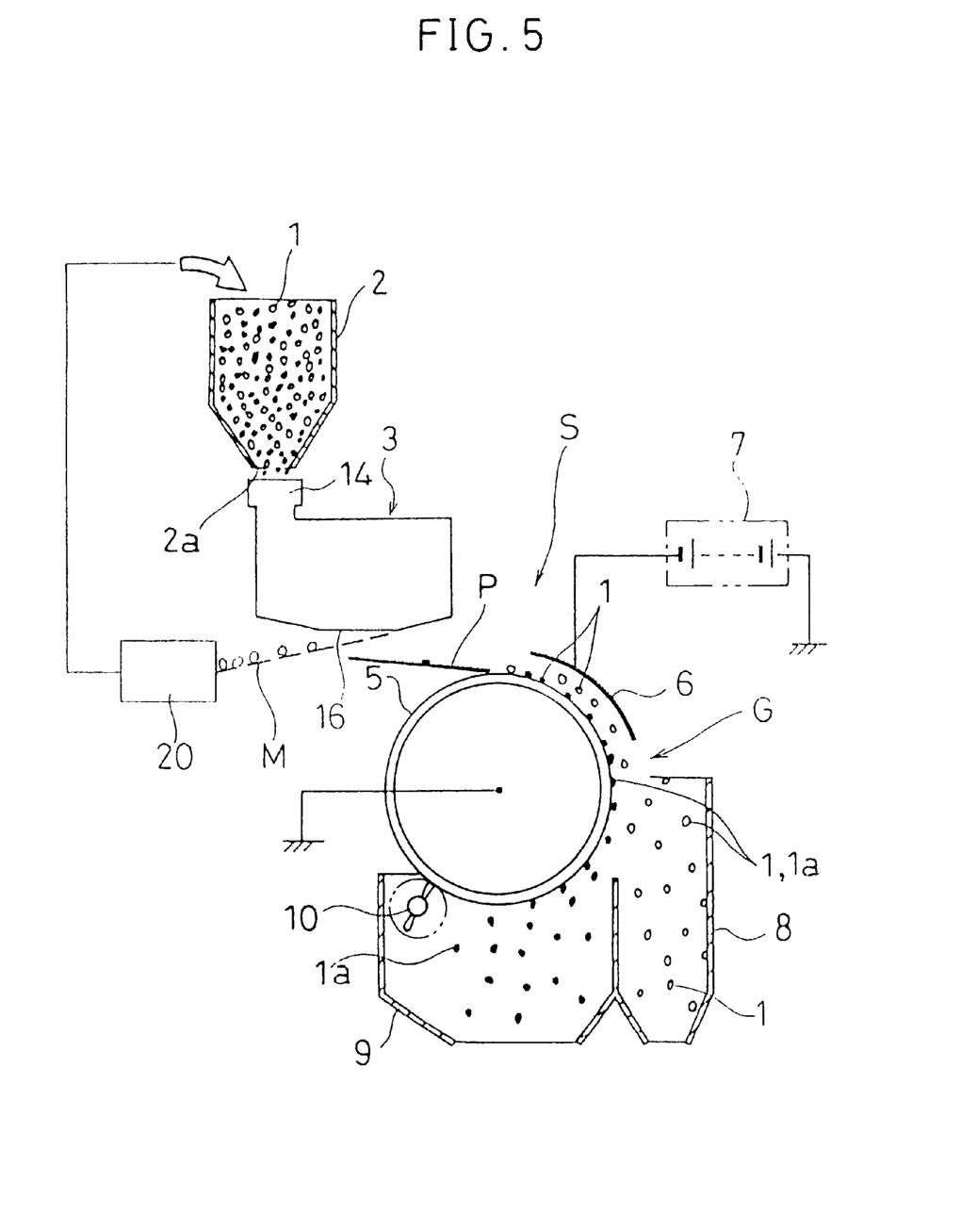
FIG. 5 is a schematic diagram illustrating an overall construction of a plastic separator according to a second embodiment of the present invention.

With reference to FIG. 5, an explanation will next be given to a plastic separator S to be employed for implementing a plastic separation method according to a second embodiment of the present invention. The plastic separator S comprises: a hopper 2 for receiving a mixture of plastic pieces 1 of plural different types of resins; a triboelectric charger 3 disposed adjacent an outlet 2a of the hopper 2 for agitating the plastic pieces to triboelectrically impart the plastic pieces with different amounts of charges having different polarities depending on the type of plastic; an electrostatic separating section G disposed below the triboelectric charger 3 for electrostatically separating the triboelectrically charged plastic pieces 1; and a first separation vessel 8 and a second separation vessel 9 for (selectively) collecting the plastic pieces 1 electrostatically separated in the electrostatic separating section G according to the type of plastic.

The triboelectric charger 3 has an agitator (not shown) provided inside a container thereof for agitating the plastic pieces, an inlet 14 provided in a top face of the container on one side thereof in communication with the outlet 2a of the hopper 2, and an outlet 16 provided in a bottom face of the container on the other side thereof for dropping the plastic pieces 1.

An inclined mesh member M for catching a triboelectrification agent is provided in the outlet 16. A guide plate P for guiding the plastic pieces 1 having passed through the mesh member M toward the electrostatic separating section G is disposed between the mesh member M and the electrostatic separating section G. A re-using device 20 is attached to a lower edge of the inclined mesh member M for feeding the triboelectrification agent caught by the mesh member M back to the hopper 2.

The triboelectrification agent is of a generally spherical shape having a diameter D1 which is greater than (e.g., twice) the size of the plastic pieces 1 (including particular plastic pieces 1a to be collected) and greater than the mesh of the mesh member M. That is, the size D of the plastic pieces and the diameter D1 of the triboelectrification agent are set so as to differ from each other and satisfy a relationship of D<D1.

As shown in FIG. 5, the electrostatic separating section G comprises: a metal drum electrode 5 disposed below the guide plate P; a high voltage electrode 6 disposed diagonally above the metal drum electrode 5; and a brush 10 disposed below the metal drum electrode 5 for scraping down the plastic pieces 1 attached on a circumferential surface of the metal drum electrode 5.

The metal drum electrode 5 is rotatable about a horizontal axis in a predetermined direction, and grounded. The high voltage electrode 6 is connected to a cathode of a high voltage power source 7. An anode of the high voltage power source 7 is grounded. With this arrangement, the metal drum electrode 5 constitutes a rotary ground electrode, so that a separation electrostatic field is generated between the high voltage electrode 6 and the metal drum electrode 5.

The first separation vessel 8 and the second separation vessel 9 are disposed below the metal drum electrode 5 in this order in the direction of the rotation of the metal drum electrode 5. The first separation vessel 8 and the second separation vessel 9 each have an open top.

By using the plastic separator S according to the second embodiment of the present invention, the recovery rate and purity as shown in FIG. 4 are provided as in the first embodiment.

Where the size of the particular plastic pieces 1 is greater than a certain level, the effective range of the diameter of the triboelectrification agent is smaller than the certain level and greater than one half the size of the particular plastic pieces 1a as described above.

Where the diameter of the triboelectrification agent is about one third to about one fourth, however, the diameter of the triboelectrification agent is out of the range of the size of the particular plastic pieces 1a. In such a case, it has been experimentally revealed that the triboelectrification agent is electrostatically adsorbed thereby not to be recovered, making it impossible to perform the separation with high accuracy.

Where the diameter of the triboelectrification agent is smaller than the size of the particular plastic pieces 1a and smaller than the mesh of the mesh member M, it is impossible to catch the triboelectrification agent by the mesh member M. In this case, the plastic pieces 1 other than the triboelectrification agent are caught and fed into the electrostatic separating section G, and the triboelectrification agent having passed through the mesh member M is separately caught and fed back into the hopper 2. Thus, the triboelectrification agent can repeatedly be used.

Where the amount of the particular plastic pieces 1a is insufficient in the aforesaid embodiments, pieces of the particular plastic are added as the triboelectrification agent, but the triboelectrification agent to be added is not limited thereto. Other examples of the triboelectrification agent to be added include plastic pieces of the same type as the particular plastic pieces, plastic pieces ranked middle in the triboelectric series among the mixed plastic pieces, and plastic pieces ranked on the positive side or the negative side in the triboelectric series. In this case, the plastic pieces 1 are each imparted with a polarity and an amount of charge (electrostatic potential) required for the electrostatic separation thereof in the electrostatic separating section G according to the type of plastic as in the aforesaid embodiments. Thus, the separation can accurately be carried out.

As is apparent from the foregoing, the present invention is arranged such that, where the amount of the particular plastic pieces is insufficient as compared with the amount of the other plastic pieces, the triboelectrification agent is additionally fed into the triboelectric charger to impart the particular plastic pieces with charges sufficient for the separation thereof in the electrostatic separating section and, at this time, the amount of the triboelectrification agent to be added is set so as to satisfy the relationship of (Wt+Wm)/W=0.1 to 0.9, wherein Wt is the weight of the particular plastic pieces in the triboelectric charger, Wm is the weight of the triboelectrification agent to be added, and W is the total weight of the plastic pieces in the triboelectric charger. With this arrangement, the plural types of crushed plastic pieces in a mixed state are fed into the triboelectric charger and agitated therein thereby to be triboelectrically imparted with charges according to the type of plastic, and then electrostatically separated according to the type of plastic in the electrostatic separating section. Thus, the particular plastic pieces can assuredly be separated from the plastic pieces.

What is claimed is:

1. A plastic separation method comprising the steps of: feeding a mixture of plural types of crushed granular plastic pieces (1) into a triboelectric charger (3); agitating the plastic pieces in the triboelectric charger for triboelectrically imparting the plastic pieces (1) with different amounts of charges having different polarities depending on the type of plastic; and electrostatically separating the plastic pieces (1) into a fraction containing pieces (1a) of a particular plastic and a fraction not containing the particular plastic pieces (1a) in an electrostatic separating section (G) for separation of the particular plastic pieces (1a) from the plastic pieces (1); wherein granular pieces of the particular plastic or granular plastic pieces of the same type as the particular plastic are additionally fed as a triboelectrification agent into the triboelectric charger (3) for triboelectrically imparting the particular plastic pieces with a polarity and an amount of charge which allow for separation of the particular plastic pieces (1a) in the electrostatic separating section (G), if the weight of the particular plastic pieces (1a) is smaller than 10% of the total weight of the plastic pieces (1).

2. A plastic separation method as set forth in claim 1, wherein the weight wm of the triboelectrification agent to be added is determined so as to satisfy the following expression:

$(Wt+Wm)/W=0.1$ to $0.9$ wherein Wt is the weight of the particular plastic pieces (1a), and W is the total weight of the plastic pieces including the triboelectrification agent in the triboelectric charger (3).

3. A plastic separation method as set forth in claim 2, wherein the triboelectrification agent has a diameter (D1) which is one half to twice a size (D) of the plastic pieces (1).

4. A plastic separation method as set forth in claim 3, wherein the diameter (D1) of the triboelectrification agent is greater than the size (D) of the plastic pieces, the method further comprising the step of: separating the triboelectrification agent from the plastic pieces on the basis of a difference in size therebetween by use of separation means (M) provided in an outlet (16) of the triboelectric charger to leave the triboelectrification agent in the triboelectric charger (3) after the triboelectric charging for repeated use of the triboelectrification agent in the triboelectric charger (3).

5. A plastic separation method as set forth in claim 3, wherein the diameter (D1) of the triboelectrification agent differs from the size (D) of the plastic pieces, the method further comprising the steps of: removing the triboelectrification agent and the plastic pieces from the triboelectric charger (3) after the triboelectric charging; separating the triboelectrification agent from the plastic pieces on the basis of a difference in size therebetween; and feeding the triboelectrification agent back into the triboelectric charger (3) for repeated use of the triboelectrification agent.

* * * * *